3,288,881
POLYEPOXIDE CURED WITH POLYCARBOXYLIC ACID AND TERTIARY AMINE ADDUCT OF A POLYEPOXIDE AND A MONOFUNCTIONAL SECONDARY AMINE
Henry L. Lee, Jr., San Marino, Calif., assignor to The Epoxylite Corporation, South El Monte, Calif., a corporation of California
No Drawing. Filed Mar. 20, 1964, Ser. No. 353,602
37 Claims. (Cl. 260—830)

This invention relates, in general, to curable polyepoxide compositions, to cure accelerators, to curing methods and to cured products produced. In particular the invention relates to polyepoxide compositions comprising a polyepoxide, an acid or acid anhydride hardener and a curing catalyst; to certain novel cure accelerators; to methods for accelerating the cure of mixtures of a polyepoxide with an acid or acid anhydride hardener; and to the cured products resulting from such compositions and methods.

In the past, it has been customary to employ tertiary amines as catalysts for the reaction between polyepoxides and polycarboxylic acids or polycarboxylic acid anhydrides. In general, these reactions, uncatalyzed, progress only sluggishly even at temperatures as high as 120° to 150° centigrade. By use of tertiary amine catalysts, the reaction may be made to progress rapidly at temperatures as low as 100° centigrade and correspondingly even faster at higher temperatures. The importance of tertiary amine catalysts and their use as accelerators for acid or acid anhydride compositions is well known to those skilled in the art.

However, the tertiary amines used in the prior art possess a number of disadvantages that preclude their use in certain applications and render the successful use of epoxide/acid or epoxide/acid anhydride systems quite difficult in other applications. For example, low-boiling tertiary amines may not be used at elevated temperatures, or under conditions of high vacuum; and in some cases, they may not be used in formulations which are cast against porous materials (such as the paper insulation used in the slots of electric motors) since the porous material will wick out the amine, and thereby remove it from the reaction. The higher boiling amines, in the main, must be used in higher amounts, and therefore remain as unreactive contaminants in the cured product, adversely influencing the physical and electrical properties and the chemical resistance. Suitable high boiling amines which contain sites reactive with the polyepoxide or the hardening agent may be developed by routes of conventional synthesis, but these become resinous modifiers, and introduce chemical chains into the cured system different in kind from those introduced by the polyepoxide and the hardener. While such chains may impart desirable properites, these desirable properties may not be regulated by increasing or decreasing the concentration of the amine, thus limiting the usefulness of these synthesized high boiling amines, and imposing the requirement for the use of further additives when wider variations of properties are desirable. When these chains introduce undesirable properties, they may not be used at all in many formulations. Thus, the class of higher boiling amines, possessing advantages as described above, and the further advantage of being useful at higher combining ratios, thus reducing the criticality of proportioning, nonetheless still have disadvantages that have not yet been overcome.

It is an object of this invention to provide compositions and methods for overcoming the prior art problems.

One specific object is to provide relatively quick curable polyepoxide/polycarboxylic acid or polyepoxide/polycarboxylic acid anhydride compositions.

Another specific object is to provide methods for accelerating the cure of polyepoxide/polycarboxylic acid or polyepoxide/polycarboxylic acid anhydride compositions.

Yet another specific object is to provide a novel class of cure accelerators for compositions containing polyepoxide and polycarboxylic acid or polycarboxylic acid anhydride hardeners.

Still another specific object is to provide solid cured polyepoxide products.

Other objects as well as the many advantages of the present invention will become apparent from the following more detailed description.

It has been discovered that the disadvantages inherent in the use of low-boiling tertiary amines, as well as the disadvantages in use of higher-boiling materials, may be overcome by using as a catalyst in epoxide/acid or epoxide/acid anhydride systems a tertiary amine adduct prepared from an epoxy-containing molecule and a suitable secondary amine. Such tertiary amine adducts possess suitably high-molecular weight to overcome the problems inherent with the lower molecular weight species. They also possess the advantage of non-reactive higher-boiling materials, since when used at suitable nitrogen content, they can be present in non-critical proportions which may range as high as 10 to 20 percent by weight based on the weight of the polyepoxide in the mixture to be cured.

In addition to overcoming the disadvantages of the low-boiling amines, while retaining the advantages of the high-boiling amines, the teritary amine adducts described herein give additional advantages over the known classes of high-boiling amine cure accelerators. The adduct may closely resemble in structure the polyepoxide to be cured thus not introducing contaminants which may adversely affect the physical and electrical properties or the chemical resistance of the cured product. The electrical insulation resistance of the cured product is improved because of the decreased mobility of the cure accelerator. In addition, such tertiary amine adducts contain reactive hydroxyl groups which may themselves assist in catalyzing the cure of the epoxide/acid or epoxide/acid anhydride mixtures. Thus the catalysts of this invention provide additional advantages of increasing the overall rate of reaction and of being coupled into the cured product, so that they will not be present in unreacted and possibly detrimental form and will not adversely influence cured properties. Another advantage of great practical importance is the greater accuracy in proportioning that can be achieved because of the high molecular weight of the teritary amine adducts.

It has further been discovered that the tertiary amine adducts described above can be further reacted with a polycarboxylic acid or more preferably a polycarboxylic acid anhydride in an amount sufficient to provide at least about 2 carboxyl groups (or one anhydride group) for each hydroxyl group in the tertiary amine adduct, to produce a novel class of compounds that are also useful as cure accelerators. These novel compounds possess all of the advantages previously described for the tertiary amine adducts, per se.

Accordingly, the invention encompasses, in one aspect, polyepoxide compositions comprising (1) a polyepoxide, (2) a polycarboxylic acid or polycarboxylic acid anhydride hardener, and (3) an adduct of a polyepoxide and a secondary amine as a curing catalyst for the composition.

In another aspect the invention provides a novel class of cure accelerators comprising the reaction product of a polycarboxylic acid or polycarboxylic acid anhydride with an adduct of a polyepoxide and a secondary amine.

In yet another aspect the invention provides polyepoxide compositions comprising (1) a polyepoxide, (2) a polycarboxylic acid or polycarboxylic acid anhydride hardener, and (3) the reaction product of a polycarboxylic acid or polycarboxylic acid anhydride with an adduct of a polyepoxide and a secondary amine as a cure accelerator for the composition.

In another aspect the invention provides methods for accelerating the cure of mixtures of a polyepoxide with a polycarboxylic acid or polycarboxylic acid anhydride by adding to such mixtures an adduct of a polyepoxide and a secondary amine or the reaction products of such adducts with a polycarboxylic acid or polycarboxylic acid anhydride.

In still another aspect, the invention provides heated and cured products of the compositions described.

The polyepoxides suitable for use in the practice of this invention may broadly be defined as molecules containing one or more epoxy groups of the formula

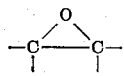

There can be a wide variety of substitutions on the carbon atoms, depending upon the raw materials and methods used in preparing the polyepoxide. Such polyepoxide materials are well known in the art. Many are described, together with methods of manufacture in Lee and Neville, "Epoxy Resins," McGraw-Hill, 1957.

Exemplary of such polyepoxides are glycidyl polyether derivatives of a polyhydric organic compound, e.g., a polyhydric alcohol or phenol. Many such polyepoxides are disclosed in various prior patents among which may be mentioned U.S. Patent No. 2,324,483, U.S. Patent No. 2,444,333, British Patents 518,057 and 579,698 and U.S. Patent 2,569,920. Most of these polyepoxides are resinous products of reaction between an epihalohydrin, for instance epichlorohydrin, and a phenol having at least two phenolic hydroxy groups, for example, 2,2′-bis(4-hydroxyphenyl propane). Other phenols that may be used include, for example, hydroquinone, resorcinol, novolak resins and the like. By reference, all of the aforementioned patents are incorporated in the present description.

Polyhydric alcohols that can be similarly reacted with, e.g., epihalohydrin to produce glycidyl polyethers include polyhydric alcohols, such as ethylene glycol, propylene glycol, trimethylene glycol, 2,3-butane diol, 1,4-dihydroxy-2-butene, 1,12-dihydroxy octadecane, 1,4-dihydroxy cyclohexane, 2,2-dimethyl-1,3-propanediol, 2-ethyl-2-butyl propanediol-1,3-glycerol, erythritol, sorbitol, mannitol, inositol, trimethylol propane, pentaerythritol, polyallyl alcohol, bis(4-hydroxycyclohexyl) dimethyl methane, 1,4-dimethylol benzene, 4,4′-dimethylol diphenyl, dimethylol xylenes, dimethylol toluenes, dimethylol naphthalenes and the like; polyhydric ether alcohols such as diglycerol, triglycerol, dipentaerythritol, tripentaerythritol, dimethylolanisoles, beta hydroxyethyl ethers of polyhydric alcohols and phenols, such as diethylene glycol, polyethylene glycols, bis(beta hydroxyethyl ether) of hydroquinone, bis(beta hydroxyethyl ether) of bisphenol, beta hydroxyethyl ethers of glycerol, pentaerythritol, sorbitol, mannitol, etc.; and condensates of alkylene oxides such as ethylene oxide, propylene oxide, butylene oxide, isobutylene oxide with polyhydric alcohols such as any of the foregoing and with polyhydric thioether alcohols such as 2,2′-dihydroxy diethyl sulfide, 2,2′,3,3′-tetrahydroxy dipropyl sulfide, 2,2′,3-trihydroxy-3′-chlorodipropyl sulfide, etc.

In addition, a wide variety of other polyepoxides that are presently of little commercial importance because of high cost, limited supply, etc. can be used in the practice of the present invention.

In referring to polyepoxides, reference is usually made to their epoxy equivalent weight. The term "epoxy equivalent weight" refers to the weight of a polyepoxide containing one equivalent of epoxide. The epoxy functionality is obtained by dividing the average molecular weight of the polyepoxide by the epoxy equivalent weight. Values for epoxy terms discussed above are based on data obtained by heating a weighed sample of the polyepoxide with an excess of 0.2 N pyridium chloride in chloroform solution at the boiling point under reflux for two hours whereby the pyridium hydrochloride hydrochlorinates the epoxy groups of chlorohydrin groups. After cooling, the excess pyridium chloride is back-titrated with 0.1 N sodium hydroxide in methanol to phenolphthaline end point. If the polyepoxides are single monomeric compounds having all their epoxide groups intact, their epoxy functionality will be whole numbers such as 2, 3, 4, 5, etc., per each polyepoxide molecule. In the case of polymeric polyepoxides, the materials may contain some monomeric monoepoxides or may have some of their epoxy groups hydrated or otherwise reacted and/or may contain higher molecular weight molecules so that the epoxy functionality may be low and contain fractional values. The polymeric material may, for example, have epoxy functionalities of 1.2, 1.5, 1.8, etc.

Any of the many well-known polycarboxylic acid or polycarboxylic acid anhydride hardeners can be used in the practice of the present invention.

Representative polycarboxylic hardeners include malonic acid, succinic acid, glutaric acid, adipic acid, isosebacic acid, alkylsuccinic acids, alkenylsuccinic acids (such as dodecenylsuccinic acid), alkylalkenylsuccinic acids (such as ethylbutenylsuccinic acid), alkenylalkylsuccinic acids, maleic acid, fumaric acid, itaconic acid, citraconic acid, mesaconic acid, glutaconic acid, ethylidenemalonic acid, isopropylidenemalonic acid, allylmalonic acid, muconic acid, alpha-hydromuconic acid, beta-hydromuconic acid, diglycolic acid, dilactic acid, 4-amyl-2,5-heptadienedioic acid, 3-hexynedioic acid, 4,6-decadiynedioic acid, 2,4,6,8-dectetraene-dioic acid, 1,2-cyclohexanedicarboxylic acid, 1,4-cyclohexanedicarboxylic acid, 2 - carboxy - 2 - methylcyclohexaneacetic acid, phthalic acid, isophthalic acid, terephthalic acid, tetrahydrophthalic acid, Nadic acid, Nadic methyl acid, hexahydrophthalic acid, tetrachlorophthalic acid, 1,8-naphthalenedicarboxylic acid, 1,2,4 - hexanetricarboxylic acid, 2-propyl - 1,2,4 - pentane - tricarboxylic acid, 5-octene-3,3,6-tricarboxylic acid, 1,2,3-propane tricarboxylic acid, 3-hexene-2,2,3,4-tetracarboxylic acid, 1,2,3,4 - benzenetetracarboxylic acid, 1,2,3,5-benzenetetracarboxylic acid, 1,2,4,5 - benzenetetracarboxylic acid, benzenepentacarboxylic acid, benzenehexacarboxylic acid and the anhydrides of any of the above acids. Mixtures of any two or more of the acids or acid anhydrides can be used if desired.

The acid or acid anhydride hardeners are generally used in a stoichiometric amount. It is to be understood, however, that the hardeners may be used in amounts ranging from about 80 percent to about 500 percent or more of the stoichiometric amount with good results. The actual amount used will depend on the particular composition to be hardened and the temperature to which the composition is subjected. For purposes of stoichiometric calculations one epoxy group is considered to react with one carboxy group. In other words, the compositions contain sufficient amounts of polycarboxylic acid or polycarboxylic acid anhydride to provide from about 0.8 to about 5.0 or more carboxy groups per epoxy group. When using anhydrides each anhydride group is considered as if it existed as two carboxy groups. Thus, lesser amounts of a dianhydride, such as pyromellitic dianhydride, are used than is the case when a dicarboxylic acid anhydride is employed as the hardener.

Secondary amines that are suitable for preparing the tertiary amine adducts can be represented by the formula

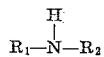

where $R_1$ can be aromatic or aliphatic and $R_2$ is aliphatic.

Among representative compounds are dimethylamine, diethylamine, dipropylamine, dibutylamine, diisobutylamine, di-(sec-butyl) amine, di-(tert-butyl) amine, dioctylamine, dinonylamine, distearylamine, diallylamine, dioleylamine, dicyclohexylamine, and dibenzylamine. The amine can also be asymmetrical as is the case with typical compounds like methylethylamine, methylisoamylamine, ethylpropylamine, methylallylamine, methylpropylamine, ethylcyclohexylamine, and methylbenzylamine. The secondary amine can also have the nitrogen atom as a member of a ring as in such representative compounds as trimethyleneimine, pyrrole, pyrrolidine, 2-methylpyrrolidine, piperidine, tetrahydropyridine, 2-methylpiperidine, 4-methylpiperidine, 2,6-dimethylpiperidine, and decahydroquinoline. While the radicals $R_1$ and $R_2$ may be substituted or unsubstituted, the amine preferably contains only the elements carbon and hydrogen besides the single secondary amine nitrogen atom. Preferably, $R_1$ and $R_2$ are aliphatic groups containing from 2 to 10 carbon atoms, and the total number of carbon atoms in $R_1$ and $R_2$ is not more than about 15. Ordinarily, the adducts are prepared from a single amine, but mixtures of two ore more different amines may be used if desired.

Polyepoxides that are useful in preparing the adducts include any of those previously mentioned or referred to. Most preferably, the polyepoxide used to form the adduct is a glycidyl polyether of a polyhydric phenol or a polyhydric alcohol. It is also generally preferred, but not necessary, to use the same polyepoxide in preparing the tertiary amine adduct as the polyepoxide to be used in the curable composition. In many cases, it will be desirable to use different polyepoxides in order to impart certain useful properties to the cured product. Thus, as illustrated in the examples to follow, use of tertiary amine adducts made from a secondary amine and a diglycidyl ether of a poly(oxyalkylene) glycol has been found to impart a highly desirable flexibility to cured films and coatings made from compositions based on diglycidyl ethers of polyhydric phenols such as 2,2-bis(4-hydroxyphenyl) propane (Bisphenol A).

In preparing the tertiary amine adducts it is very important to provide at least about one mole of secondary amine for each epoxy group in the polyepoxide so as to produce a pure adduct. Greater than stoichiometric amounts, e.g., up to 4 or 5 moles of amine or more per epoxy group can be used if desired, but unreacted amine should be distilled out, lest the residual secondary amine react with the acid or acid anhydride hardener to form an amide, thereby endstopping the curing reaction or reducing the reactivity of the hardener.

The tertiary amine adducts are prepared by mixing the raw materials in suitable proportions at virtually any convenient temperature. Reaction will occur and proceed to completion at ambient temperatures if sufficient time is allotted. Preferably the mixture is moderately heated to temperatures of from about 50° to about 150° centigrade in order to initiate the reaction. The reaction is exothermic so that once initiated it proceeds to completion in about 1 to about 18 hours or so. The reaction should be conducted at a temperature below the boiling point of the secondary amine or with the aid of a reflux column.

The tertiary amine adducts comprise a polyfunctional tertiary amine as indicated by the following exemplary typical reaction equation:

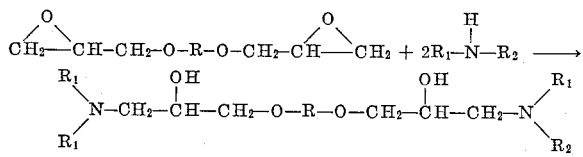

where R represents the residue of a dihydric organic compound (e.g., Bisphenol A) and $R_1$ and $R_2$ are as previously described.

The tertiary amine adducts are active cure accelerators for polyepoxide/polycarboxylic acid or polyepoxide/polycarboxylic anhydride mixtures over a wide range of proportions. Usually the accelerator must be present in amounts sufficient to provide at least about 0.001 tertiary amine group for each epoxy group in the polyepoxide to be cured. Much higher amounts, up to 0.2 or more tertiary amine groups per epoxy group, can be used if desired. Most preferably the amount of accelerator is sufficient to provide from about 0.005 to about 0.02 tertiary amine group per epoxy group. In general, higher concentrations of tertiary amine adducts provide faster cure times at any given temperature. It will be understood that the activity of the adducts will vary depending upon the materials used to prepare the same. The adducts may be incorporated in the total composition by mixing it with the polyepoxide, with the hardener, with some plasticizer that might be used in the composition or with a preformed mixture of polyepoxide and hardener.

It is preferred to use tertiary amine adducts that are liquids or low melting solids in order to facilitate incorporation into the polyepoxide, the hardener of the polyepoxide-hardener mixtures. Although higher and lower molecular weight catalysts may be employed, preferably the catalyst has a molecular weight such that it is present in the total composition in amounts from about one to about 20 percent by weight of the polyepoxide and most preferably about 5 to about 10 percent by weight.

The novel class of cure accelerators of this invention are reaction products of polycarboxylic acid or, preferably, polycarboxylic acid anhydride with the tertiary amine adducts fully described hereinabove. Exemplary of such reaction products are those prepared from dicarboxylic acids or anhydrides which can be conveniently represented by the general formula:

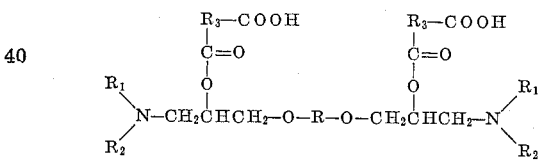

where R, $R_1$ and $R_2$ each have the meaning previously described and $R_3$ represents the residue of the dicarboxylic reactant.

Any desired polycarboxylic acid or polycarboxylic acid anhydride can be used in preparing the novel reaction products including, for example, any of the polycarboxylic acid and polycarboxylic acid anhydride hardeners specifically mentioned hereinabove. In preparing the novel reaction products it is preferred to use polycarboxylic anhydride reactants in order to avoid any problems resulting from by-product water.

In order to illustrate the practice of this invention the following exemplary specific examples are presented.

EXAMPLE 1

Nineteen grams of a commercially available diglycidyl ether of Bisphenol A having a molecular weight of 380 and an epoxy equivalent weight of 190 was added to 0.1 mol (7.3 grams) of diethylamine. The mixture was reacted by warming in a closed jar at 150° Fahrenheit for 16 hours. Infrared analysis established that the amine hydrogen and the epoxy groups in the reactants had disappeared, and hence that the reaction was complete.

This adduct was used as a cure accelerator for curing mixtures of dodecenyl succinic anhydride and the same polyepoxide from which the adduct had been prepared.

The novel reaction products are readily prepared by admixing the tertiary amine adduct and polycarboxylic reactant in suitable proportions at temperatures sufficient to allow solution of the adduct in the polycarboxylic reactant. The polycarboxylic reactant should be present in at least about stoichiometric proportions. In other words, sufficient amounts of the polycarboxylic acid or polycarboxylic acid anhydride should be used to provide at least about 2 carboxyl groups (or alternatively one anhydride group) for each hydroxyl group in the tertiary amine adduct. Slightly lower amounts may be used if desired. Much higher amounts of the polycarboxylic reactant may be used in which case the excess polycarboxylic acid or polycarboxylic acid anhydride serves as a carrier or diluent for the final reaction product.

The novel reaction products of tertiary amine adduct and polycarboxylic acid or anhydride are in general highly viscous liquids or solids at normal room temperature. They are, nevertheless, quite readily incorporated into polyepoxide compositions. This can be accomplished by heating the reaction product to temperatures where its viscosity is low enough to be mixed with the polyepoxide, with the hardener, or with mixtures of the polyepoxide and hardener. The novel reaction products can also be incorporated into the polyepoxide compositions by use of a suitable inert solvent. In use of the novel reaction products as cure accelerators they should be used in amounts sufficient to provide a ratio of tertiary amine groups to epoxide groups in the same ranges previously described for the tertiary amine adducts.

The amount of adduct needed to give good cures with reasonable pot life was found to be in the range of from about .005 to about .01 tertiary amine group per epoxy group. Amounts outside this range also gave solid cured products but resulted in longer or shorter pot lives, as shown in Table I below. In each of the mixtures sufficient amounts of anhydride were used to provide about 0.85 anhydride group for each epoxy group.

anhydride and of tertiary amine accelerator were sufficient to provide 0.85 anhydride group and 0.02 tertiary amine group, respectively, for each epoxy group in the polyepoxide. In each instance, the anhydride and the adduct were premixed overnight at 200° Fahrenheit before admixture with the polyepoxide. Results are shown in Table II.

*Table II*

| Example | Adduct Made From | Gel Time in Minutes at 200° Fahrenheit | Shore D Hardness at room temperature, after further curing for 16 hours at 200° Fahrenheit |
|---|---|---|---|
| 2 | Di-isopropylamine | 396 | 85 |
| 3 | Di-butylamine | 37 | 80 |
| 4 | Di-sec-butylamine | >8 hours | 84 |
| 5 | Di-amylamine | 106 | 82 |
| 6 | N-butyl aniline | 422 | 85 |
| 7 | Piperidine | 47 | 81 |
| 8 | Dicyclohexylamine | >8 hours | 84 |
| 9 | Di-n-propylamine | 39 | 84 |

EXAMPLES 10–12

Adducts were made from diethylamine, di-n-propylamine and di-isopropylamine with a commercially available diglycidyl ether of polypropylene glycol. This polyepoxide had a molecular weight of about 620.

A 19 gram portion of the polyepoxide of Example 1 was cured by mixing with 15.4 grams of hexahydrophthalic acid to which 0.84 gram of the adduct prepared from di-n-propylamine (0.02 tertiary amine group) had been added. When mixed at 200° Fahrenheit, a gel time of 43 minutes was observed.

A plurality of mixtures of hexahydrophthalic acid and

*Table I*

| | Tertiary Amine Group Per Epoxide Group | | | | | |
|---|---|---|---|---|---|---|
| | 0 | .001 | .005 | .01 | .020 | .030 |
| Gel time at 250° Fahrenheit | No gel in 24 hours. | 210 min | 150 min | 50 min | 32 min | 30 min. |
| Shore D Hardness at room temperature after curing 24 hours at 250° Fahrenheit. | | 74 | 73/70 | 78 | 82 | 80. |

A plotted curve of gel versus the number of tertiary amine groups was an equilateral hyperbole. Similar curves have been observed previously for mixtures cured with monomeric type accelerators such as benzyl dimethyl amine.

the polyepoxide of Example 1, containing one anhydride group for each epoxide group, were cured with varying amounts of the adduct made from diethylamine and the diglycidyl ether of polypropylene glycol. Results are shown in Table III.

*Table III*

| | Tertiary Amine Group Per Epoxide Group | | | | | | | |
|---|---|---|---|---|---|---|---|---|
| | .001 | .005 | .010 | .020 | .030 | .050 | 0.100 | .200 |
| Adduct concentration in parts per 100 parts polyepoxide | 0.2 | 1.04 | 2.08 | 4.1 | 6.1 | 10.3 | 20.6 | 41.4 |
| Gel time at 200° Fahrenheit, minutes | 185 | 57 | 35 | 26 | 20 | 14 | 6 | 5 |

EXAMPLES 2–9

A series of 8 adducts was made from the polyepoxide described in Example 1 and, respectively, the following secondary amines: di-isopropylamine, di-butylamine, di-sec-butylamine, di-amylamine, N-butyl-aniline, piperidine, dicyclohexylamine, di-n-propylamine.

These adults were used as cure accelerators for curing mixtures of hexahydrophthalic anhydride and the polyepoxide described in Example 1 (from which the adducts had been prepared). In each mixture the amounts of The use of the diglycidyl ether of polypropylene glycol as the polyepoxide for preparing the adduct leads to the introduction of a long chain molecule into the polyepoxides cured with anhydride hardener using such adduct as a cure accelerator, thus promoting flexibilization, as shown by Table IV which presents hardness versus temperature for the cured products produced from the compositions shown in Table III. In all cases the products tested were prepared by curing overnight (about 16 hours) at about 200° Fahrenheit and then cooling to ambient temperature (about 75° Fahrenheit).

Table IV

| Hardness Test Temperature | Tertiary Amine Group Per Epoxy Group | | | | | | | |
|---|---|---|---|---|---|---|---|---|
| | .001 | .005 | .010 | .020 | .030 | .050 | 0.1 | 0.2 |
| | Share D Hardness | | | | | | | |
| Room Temp | 84 | 85 | 85 | 85 | 85 | 85 | 85 | 83/81 |
| 150° F | 82 | 83 | 84 | 84 | 83 | 84 | 81 | 71/66 |
| 200° F | 81 | 73 | 80 | 80 | 83 | 81 | 76 | 52/39 |
| 250° F | 63/59 | 74/66 | 73/64 | 70/65 | 68/62 | 72/61 | 37/35 | 23/21 |
| 300° F | 60/51 | 48/46 | 38/37 | 44/42 | 35/33 | 43/42 | 28/27 | 34 |
| | Barcol Hardness | | | | | | | |
| 200° F | 14 | 18 | 8 | 9 | 4 | 2 | 0 | 0 |

EXAMPLE 13

A tertiary amine adduct was prepared from a commercially available diglycidyl ether of Bisphenol A having a molecular weight of about 380 and an epoxide equivalent weight of about 190. Nineteen grams of this polyepoxide were mixed with 7.3 grams of diethyl amine and reacted in a closed jar for about 20 hours at room temperature. Infrared analysis of a portion of the product mixture established that the amine hydrogen and epoxy groups in the reactants had disappeared, and thus that the reaction was complete.

EXAMPLE 14

A polyester reaction product of the tertiary amine adduct of Example 13 was prepared by mixing, at 150° Fahrenheit, 26.3 grams of the adduct and 15.4 grams of hexahydrophthalic anhydride. The anhydride was present in amounts sufficient to provide one anhydride group for each hydroxyl group in the tertiary amine adduct. An exothermic reaction occurred between the materials. The viscosity of the reacting mixture increased during the progress of the reaction. Completion of the reaction was established by the absence of any indication of hydroxyl groups upon infrared analysis of the product. The reaction product was a solid at room temperature.

A second reaction product was prepared and identified in the same manner from a mixture of the adduct of Example 13 and sufficient amounts of hexahydrophthalic anhydride to provide 2 anhydride groups for each hydroxyl group in the adduct. This product was also a solid at room temperature.

Both products were capable of ready incorporation into polyepoxide-polycarboxylic acid or polyepoxide-polycarboxylic acid anhydride compositions after heating. Each was found to be an active cure accelerator for such compositions.

EXAMPLE 15

By proceeding in a manner similar to that described in Example 14, polyester reaction products of the adduct of Example 13 and Nadic methyl anhydride were prepared and identified. Nadic anhydride is a trade mark for commercially available 4-endomethylenetetrahydrophthalic anhydride. Nadic methyl anhydride is a methyl substituted product. In this example the mixtures of adduct and anhydride were heated to 250° Fahrenheit in order to achieve complete reaction. These products were prepared from three different mixtures containing from about 40 to about 25 anhydride groups per hydroxyl group. All three products were solids at room temperature. Upon heating, each product could be incorporated into polyepoxide compositions containing polycarboxylic hardener to serve as active cure accelerators for such compositions.

EXAMPLE 16

Polyester reaction products were prepared from the adduct of Example 13 and dodecenylsuccinic anhydride using the same procedures and proportions as used in Example 14. Both of the products were solids at room temperature. The products were identified by infrared analysis, as in the preceding examples.

EXAMPLE 17

A commercially available diglycidyl ether of Bisphenol A having an epoxide equivalent weight of about 195 was cured with hexahydrophthalic anhydride, using the polyester reaction product of Example 16 as a cure accelerator. The formulation of the composition was as follows:

| | Grams |
|---|---|
| Diglycidyl ether | 100 |
| Anhydride | 74 |
| Reaction product from Example 16 | 10 |

The materials were mixed at a temperature of about 200° Fahrenheit. The composition had a gel time of 120 minutes at 200° Fahrenheit.

What is claimed is:

1. Curable composition comprising (1) a first polyepoxide having an epoxy functionality greater than 1.0, (2) a hardening agent selected from the group consisting of polycarboxylic acids, polycarboxylic acid anhydrides and mixtures thereof in sufficient amounts to provide from about 0.8 to about 5 carboxy groups for each epoxy group in said first polyepoxide, and (3) a cure accelerator comprising a preformed tertiary amine adduct of a second polyepoxide having an epoxy functionality greater than 1.0 with sufficient amounts of a monofunctional secondary amine to provide at least about one mole of amine per epoxy group in said second polyepoxide, said adduct being present in said composition in an amount sufficient to provide at least about .001 tertiary amine group per epoxy group in said first polyepoxide.

2. Composition of claim 1 wherein the first and second polyepoxide are individually selected from the group consisting of glycidyl polyethers of a polyhydric phenol and glycidyl polyethers of a polyhydric alcohol.

3. Composition of claim 1 wherein the first and second polyepoxide each is a glycidyl polyether of a polyhydric phenol.

4. Composition of claim 1 wherein the first polyepoxide is a glycidyl polyether of a polyhydric phenol and the second polyepoxide is a glycidyl polyether of a polyhydric alcohol.

5. Composition of claim 1 wherein the secondary amine is selected from the group consisting of (1) a compound having the general formula:

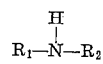

wherein $R_1$ is selected from the group consisting of aromatic and aliphatic radicals and $R_2$ is an aliphatic radical, and (2) mixtures of such compounds.

6. Composition of claim 5 wherein each of $R_1$ and $R_2$ are aliphatic radicals containing from 2 to 10 carbon atoms and the total number of carbon atoms in $R_1$ and $R_2$ is not more than about 15.

7. Composition of claim 1 wherein the cure accelerator is present in amounts sufficient to provide about .005 to about 0.02 tertiary amine group per epoxy group in said first polyepoxide.

8. The cured solid product of the composition of claim 1.

9. The cured solid product of the composition of claim 2.

10. The cured solid product of the composition of claim 3.

11. The cured solid product of the composition of claim 4.

12. The cured solid product of the composition of claim 5.

13. The cured solid product of the composition of claim 6.

14. Method for accelerating the cure of compositions comprising (1) a first polyepoxide having an epoxy functionality greater than 1.0, and (2) a hardening agent selected from the group consisting of polycarboxylic acids, polycarboxylic acid anhydrides and mixtures thereof in sufficient amounts to provide from about 0.8 to about 5 carboxy groups for each epoxy group in said polyepoxide; comprising adding to said compositions in an amount sufficient to provide at least about .001 tertiary amine group per epoxide group in said first polyepoxide a preformer tertiary amine adduct of a second polyepoxide having an epoxy functionality greater than 1.0 with sufficient amounts of a monofunctional secondary amine to provide at least about one mole of amine per epoxy group in said second polyepoxide.

15. Method of claim 14 wherein the first and second polyepoxide are individually selected from the group consisting of glycidyl polyethers of a polyhydric phenol and glycidyl polyethers of a polyhydric alcohol.

16. Method of claim 14 wherein the first and second polyepoxide each is a glycidyl polyether of a polyhydric phenol.

17. Method of claim 14 wherein the first polyepoxide is a glycidyl polyether of a polyhydric phenol and the second polyepoxide is a glycidyl polyether of a polyhydric alcohol.

18. Method of claim 14 wherein the secondary amine is selected from the group consisting of (1) a compound having the general formula:

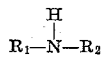

wherein $R_1$ is selected from the group consisting of aromatic and aliphatic radicals and $R_2$ is an aliphatic radical, and (2) mixtures of such compounds.

19. Method of claim 14 wherein the cure accelerator is present in amounts sufficient to provide about .005 to about 0.02 tertiary amine group per epoxy group.

20. Polyester reaction product of (a) a preformed tertiary amine adduct of a polyepoxide having an epoxy functionality greater than 1.0 with sufficient amounts of a monofunctional secondary amine to provide at least about one mole of amine per epoxy group in said polyepoxide with (b) sufficient amounts of a material selected from the group consisting of polycarboxylic acids, polycarboxylic acid anhydrides and mixtures thereof to provide at least about 2 carboxy groups for each hydroxyl group in said preformed adduct.

21. Reaction product of claim 20 wherein the secondary amine is selected from the group consisting of (1) a compound having the general formula:

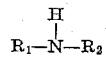

wherein $R_1$ is selected from the group consisting of aromatic and aliphatic radicals and $R_2$ is an aliphatic radical, and (2) mixtures of such compounds.

22. Reaction product of claim 21 wherein each of $R_1$ and $R_2$ are aliphatic radicals containing from 2 to 10 carbon atoms and the total number of carbon atoms in $R_1$ and $R_2$ is not more than about 15.

23. Reaction product of claim 20 wherein the polyepoxide is a member of the group consisting of glycidyl polyethers of a polyhydric phenol and glycidyl polyethers of a polyhydric alcohol.

24. Reaction product of claim 23 wherein the polyepoxide is a glycidyl polyether of a polyhydric phenol.

25. Reaction product as defined in claim 20 wherein said material (b) is a polycarboxylic acid anhydride.

26. Curable composition comprising (1) a first polyepoxide having an epoxy functionality greater than 1.0, (2) a hardening agent selected from the group consisting of polycarboxylic acids, polycarboxylic acid anhydrides and mixtures thereof in sufficient amounts to provide from about 0.8 to about 5 carboxy groups for each epoxy group in said first polyepoxide, and (3) a cure accelerator comprising the polyester reaction product of (a) a preformed tertiary amine adduct of a second polyepoxide having an epoxy functionality greater than 1.0 with sufficient amounts of a monofunctional secondary amine to provide at least about one mole of amine per epoxy group in said second polyepoxide with (b) sufficient amounts of a material selected from the group consisting of polycarboxylic acids, polycarboxylic acid anhydrides and mixtures thereof to provide at least about 2 carboxy groups for each hydroxyl group in said preformed adduct, said polyester reaction product being present in said composition in an amount sufficient to provide at least about .001 tertiary amine group per epoxy group in said first polyepoxide.

27. Composition as defined in claim 26 wherein the first and the second polyepoxide each is a glycidyl polyether of a polyhydric phenol.

28. Composition as defined in claim 26 wherein the secondary amine is selected from the group consisting of (1) a compound having the general formula:

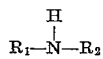

wherein $R_1$ is selected from the group consisting of aromatic and aliphatic radicals and $R_2$ is an aliphatic radical, and (2) mixtures of such compounds.

29. Composition as defined in claim 28 wherein each of $R_1$ and $R_2$ are aliphatic radicals containing from 2 to 10 carbon atoms and the total number of carbon atoms in $R_1$ and $R_2$ is not more than about 15.

30. The cured solid product of the composition of claim 26.

31. The cured solid product of the composition of claim 27.

32. The cured solid product of the composition of claim 28.

33. The cured solid product of the composition of claim 29.

34. Method for accelerating the cure of compositions comprising (1) a first polyepoxide having an epoxy functionality greater than 1.0, and (2) a hardening agent selected from the group consisting of polycarboxylic acids, polycarboxylic acid anhydrides and mixtures thereof in sufficient amounts to provide from about 0.8 to about 5 carboxy groups for each epoxy group in said first polyepoxide; comprising adding to said compositions in an amount sufficient to provide at least about .001 tertiary amine group per epoxide group in said first polyepoxide a polyester reaction product of (a) a preformed tertiary amine adduct of a second polyepoxide having an epoxy functionality greater than 1.0 with sufficient amounts of a monofunctional secondary amine to provide at least about one mole of amine per epoxy group in said second polyepoxide with (b) sufficient amounts of a material selected from the group consisting of polycarboxylic acids, polycarboxylic acid anhydrides and mixtures thereof to provide at least about 2 carboxy groups for each hydroxyl group in said preformed adduct, said polyester reaction product being present in said composition in an amount sufficient to provide at least about .001 tertiary amine group per epoxy group in said first polyepoxide.

35. Method of claim 34 wherein the first and the second polyepoxide each is a glycidyl polyether of polyhydric phenol.

36. Method of claim 34 wherein the secondary amine is selected from the group consisting of (1) a compound having the general formula:

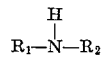

wherein $R_1$ is selected from the group consisting of aromatic and aliphatic radicals and $R_2$ is an aliphatic radical, and (2) mixtures of such compounds.

37. Method of claim 34 wherein the cure accelerator is present in amounts sufficient to provide about .005 to about 0.02 tertiary amine group per epoxy group.

References Cited by the Examiner
UNITED STATES PATENTS 2,906,723   9/1959   Reese _____ 260—830

MURRAY TILLMAN, *Primary Examiner.*

P. LIEBERMAN, *Assistant Examiner.*